United States Patent [19]

Craven

[11] 3,776,752

[45] Dec. 4, 1973

[54] PROCESS FOR FINISHING SURFACES

[75] Inventor: James Milton Craven, Wilmington, Del.

[73] Assignee: E. I. du Pont de Nemours and Company, Wilmington, Del.

[22] Filed: June 29, 1971

[21] Appl. No.: 158,093

Related U.S. Application Data

[63] Continuation-in-part of Ser. No. 834,505, June 18, 1969, abandoned.

[52] U.S. Cl............... 117/10, 117/63, 117/72, 117/132 C, 117/148
[51] Int. Cl............... B44d 1/02, B44d 1/44
[58] Field of Search............ 117/37, 63, 8, 161 UN, 117/161 UT, 161 UC, 132 C, 148, 10

[56] References Cited
UNITED STATES PATENTS

| | | | |
|---|---|---|---|
| 1,712,600 | 5/1929 | Westphal | 117/63 |
| 1,994,269 | 3/1935 | Bonniksen | 117/63 |
| 2,431,078 | 11/1947 | Powell et al. | 117/37 X |
| 2,565,602 | 8/1951 | Fisher et al. | 117/37 X |
| 2,568,765 | 9/1951 | Roon et al. | 117/37 X |
| 2,568,766 | 9/1951 | Roon et al. | 117/37 X |
| 2,568,864 | 9/1951 | Moffit et al. | 117/37 X |
| 2,715,587 | 8/1955 | Armitage et al. | 117/63 |
| 2,866,720 | 12/1958 | Martin et al. | 117/63 X |
| 2,877,588 | 3/1959 | Ernst | 117/8 |
| 3,000,757 | 9/1961 | Johnston | 117/63 |

FOREIGN PATENTS OR APPLICATIONS

| | | | |
|---|---|---|---|
| 653,256 | 5/1951 | Great Britain | 117/37 X |
| 853,825 | 11/1955 | Great Britain | 117/37 X |

Primary Examiner—William D. Martin
Assistant Examiner—Dennis C. Konopacki
Attorney—Robert W. Black

[57] ABSTRACT

A novel wiping-type color composition is provided containing (A) a volatile organic liquid, (B) a dispersed polymer (e.g. an acrylic polymer) in the form of tiny solid coalescible particles which are insoluble in (A) at normal storage conditions and will not coalesce when applied at 25°C. and (C) a dispersed pigment which is present in an amount such that the (B):(C) weight-ratio is about 1:99 to 40:60. The process of applying this organosol is also claimed.

8 Claims, No Drawings

PROCESS FOR FINISHING SURFACES

This application is a continuation-in-part of U.S. Ser. No. 834,505, filed June 18, 1969, now abandoned.

The present invention provides an organosol composition suitable for use as a wiping stain, filler, or glaze for wood furniture. The organosol has a film-forming polymer of at least 50 percent acrylic monomer units dispersed with a pigment, as hereinafter described which polymer does not coalesce under typical conditions of application, i.e., ambient atmospheric conditions, but which polymer will coalesce on exposure to coalescing means. The powder-like nature of uncoalesced polymer aids in the wiping or glaze application. The polymeric component will coalesce in a subsequent coalescing step.

The present invention comprises a dispersion comprising a continuous organic liquid phase and a dispersed phase comprising A. particles of a linear polymer which polymer has a Tg between about 10°C. and 70°C., is amorphous and has at least 50 percent by weight of acrylic monomer units, said dispersed polymer phase being substantially insoluble in said liquid phase at temperatures up to about 38°C., and B. particles of a pigment, the weight ratio of A:B being about 1:99 to 40:60 said dispersed polymer being present in an amount of less that 15 percent by weight, said dispersion forming a noncoalescing layer when applied and dried by evaporation of volatile components in the liquid phase at temperatures up to about 38°C.

Preferably the Tg of the polymer is between about 25°C. and 70°C. and most preferably wherein the polymer has a Tg of between about 40°C. and 70°C.

The polymer present in the disperse phase is desirably at least one member of the group consisting of poly(alkyl acrylates), poly(alkyl methacrylates), and interpolymers of about 50–99.9 percent by weight of units of an alkyl acrylate or an alkyl methacrylate and about 0.1–50 percent by weight of units of another ethylenically unsaturated compound selected from the group consisting of poly(vinyl acetate), polystyrene, poly(vinyl choride), poly(vinylidene chloride).

The weight ratio of A:B is in one embodiment between about 5:95 and 35:65. The composition may contain a dispersion stabilizer adapted to render the composition resistant to agglomeration and settling. The particles of the polymeric component have an average diameter in the range of about 0.01 to 25 microns. The particles preferably have an average diameter of about 0.05–1.0 micron.

This invention also includes a process which comprises applying to the surface of a substrate the above dispersion and forming therefrom a layer of the dispersed phase having substantially no coalescence, wiping said surface with wiping means to attain the desired appearance of the wiped layer on the surface and subjecting the layer to coalescing means to form a substantially coalesced layer. Typically the coalescing means comprises contacting the layer with a solvent and subsequently evaporating the solvent.

The disperse phase is usually made of a polymer having a Tg of at least 10°C.; and in some applications a polymer having a Tg of at least 40°C. is preferred. "Tg" refers to the "glass transition temperature."

The polymers of the claimed range have a Tg between such limits as to effect a balance between ease of coalescence by practical commonly used means (in application) and mar resistance under prolonged heavy load (of a surface in use). Raising Tg tends to result in increased difficulty in coalescence. Lower Tg tends to decrease resistance to flow under heavy load. The Tg range of the polymers in the dispersion of the claimed invention, results in satisfactory resistance to flow of a surface in a finished article. Preferred ranges of Tg provide even better use properties of the polymer in the finished article.

Similarly, the amorphous nature of the polymer helps provide for coalescence. This property together with solubility of the polymer in common solvents tends to provide for coalescence by means not harmful to the substrate to which this finish is applied.

Percent coalescence of a layer is measured by the abrasion resistance of a layer compared to the abrasion resistance of a completely coalesced layer of the same material determined as described hereinafter.

The dispersion of the present invention forms a substantially uncoalesced layer on evaporation of the volatile components of the liquid phase at temperatures up to about 38°C. This is necessary in a wiping composition to provide freedom to wipe a substrate without tackiness. On the scale of percent coalescence a substantial absence of coalescence is a value of approaching zero.

Because conditions of the industry are such that work is accomplished at ambient conditions the dispersion of the invention must form a substantially uncoalesced layer at temperatures up to about 38°C. (ambient environment).

Elevated temperatures are not considered satisfactory for wood for long exposures and therefore coalescence of polymer coatings for wood, on wood are best carried out by a "solvent treatment" at room temperature or slightly elevated temperature. Polymers such as polyvinyl chloride which require for purposes of this invention excessive heat to coalesce are not considered suitable.

DEGREE OF COALESCENCE

Degree of coalescence is measured by the abrasion resistance of a given layer of polymer (film) in cycles/-mil (as described hereinafter) as compared to the abrasion resistance of a completely coalesced film. Degree of coalescence can be determined as follows:

Steel panels (4" × 4" with a 1/4" hole punched in center) are sprayed with a red, steel primer and dried. The thickness of the primer on each panel is then measured with an Elcometer (Elcometer Instruments Ltd., Droylsden, Manchester, England. Available from Gardner Laboratory, Inc., Bethesda, Md.). The primed panels are then sprayed with a solution of the polymer to be tested and the organosol of the polymer to be tested and dried at the desired temperature. The total thickness of primer and experimental material is then measured with the Elcometer and the previously determined primer thickness subtracted to give the thickness of the experimental film.

The panels are then abraded on a Taber Abraser using S-33 sandpaper strips adhered to the outside of the two rubber wheels. Fresh sandpaper is used for each sample. Using a 250 g. load, the panels are abraded until one half of the abraded area of the experimental film is completely abraded away exposing the red primer underneath. The number of cycles required to do this is divided by the thickness of the experimental film to give the abrasion resistance in cycles/mil. Uncoalesced material should have no abrasion resistance and should expose the primer in about 1 cycle.

For ease of coalescence, polymer should dissolve at room temperature, i.e., up to about 38° C. in at least one of the following common solvents or a mixture thereof. Aromatic hydrocarbon, b.p. < 150° C., such as toluene, xylene; $C_1$—$C_{10}$ aliphatic or alicyclic primary, secondary or tertiary alcohol, such as methanol, ethanol, isopropanol, butanol, amyl alcohol, methyl isobutyl carbinol, cyclohexanol, t-butyl alcohol, 2-ethylhexanol; $C_3$—$C_{10}$ aliphatic or alicyclic ketone, such as acetone, diisobutyl ketone, methyl ethyl ketone, ethyl amyl ketone, methyl isopropyl ketone, isophorone, methyl isobutyl ketone, methyl isobutyl ketone, diethyl ketone, mesityl oxide, cyclo-hexanone, diacetone alcohol; esters of $C_1$—$C_4$ aliphatic acid with a $C_1$—$C_6$ aliphatic alcohol, such as ethyl acetate, isopropyl acetate, methyl acetate, n-butyl acetate, sec-butyl acetate, isobutyl acetate, n-propyl acetate, amyl acetate, butyl lactate ethyl lactate, isobutyl isobutyrate, α-methyl isoamyl acetate; $C_2$—$C_{10}$ polyether, such as mesityl oxide, butoxyethyl alcohol, butoxyethyl acetate, monobutyl ether of diethylene glycol, monoethyl ether of diethylene glycol, ethoxyethyl alcohol, ethoxyethyl acetate, monoethyl ether of triethylene glycol, methoxyethanol, monomethyl ether of diethylene glycol.

To test for solubility, mix 0.03 g. of polymer powder in 1 ml solvent in a test tube and insert a stopper. Gentle shaking should be sufficient to dissolve at least 95 percent of the polymer in less than 24 hours. If all the polymer dissolves to give a clear or hazy solution it is considered soluble. If a trace of insoluble powder remains undissolved, the polymer is still considered soluble. If the polymer remains visible—whether swollen, broken up, emulsified or unaffected it is considered insoluble even though some may have dissolved.

Some polymers which would be useful are
60/40 MMA/MA
55/40/5 MMA/MA/DMAM
70/30 MMA/EA
80/20 MMA/BA
60/40 MMA/2EHA
75/25 EMA/MA
90/10 EMA/EA
50/50 MMA/BMA
60/39/1 MMA/MA/MAA
wherein
MMA = Methyl methacrylate
MA = Methyl Acrylate
EA = Ethyl acrylate
EMA = Ethyl methacrylate
BA = Butyl acrylate
2EHA = 2-Ethylhexyl acrylate
BMA = Butyl methacrylate
DMAM = Dimethylaminoethyl methacrylate
MAA = Methacrylic acid

DESCRIPTION OF THE PREFERRED EMBODIMENTS

The color composition is preferably formulated so that it has good storage stability; for example, a dispersion stabilizer is preferably present in an amount sufficient to render the composition as initially prepared resistant to undue settling and agglomeration of the nonvolatile components. In such a composition, any solid components that settle out during storage of the composition, e.g., for about 3 months at about 22°C., can usually be redispersed by a brief period of agitation. One very useful stabilizer is illustrated in Example 1 below, in Formulas A and B. The graft copolymers described by Armour et al in the claims of Swiss Pat. No. 464,528, granted Oct. 31, 1968, illustrate another useful type of dispersion stabilizer.

The liquid phase of the novel composition can contain volatile organic liquid which is adapted for use as the continuous phase of a polymer dispersion. The liquid is one in which the dispersed polymer particles are substantially insoluble, at least under the conditions to which the composition will be exposed during storage, application to the substrate, and wiping of the colorcoat. The liquid is "volatile" in the sense that it can be evaporated under conditions which are not harmful to any component of the coated substrate.

If a small portion, e.g., up to about 5 percent, of the polymer goes into solution this may or may not harm the utility of the composition for a particular application. Thus, if the portion dissolved is a low molecular weight fraction of the polymer, the composition might still have satisfactory spraying and wiping characteristics for some uses in spite of a slight increase in viscosity or tackiness. Generally however, the compositions which have the most beneficial utility and the best application and wiping characteristics, are those in which none, or practically none, of the polymer particles are dissolved or coalesced prior to completion of the wiping operation.

Some of the most useful embodiments of the composition employ an aliphatic hydrocarbon as the liquid phase, for example naphtha, kerosene hexane, mineral spirits and the like, and blends thereof. Also useful are mixtures of such liquids with up to about 25 percent, based on the total weight of the liquid phase of other kinds of volatile organic liquids, for example aromatic hydrocarbons, ketones, esters, ethers, alkanols and the like and blends thereof. The liquid phase can consist of a mixture of a nonsolvent for the polymer component and a solvent for the polymer as long as the solvent is not added in an amount which will result in any harmful solvent action on the polymer particles, i.e., result in coalescence of the applied layer. When using such a mixture, if there is undue coalescence of the polymer particles or an undue increase in tackiness or viscosity of the color coat before the wiping operation is completed, this indicates that the polymer is not sufficiently insoluble in the liquid phase. Among the corrective measures which can be taken to render such a composition useful are these: (1) add more non-solvent; (2) use a less volatile non-solvent so the solvent will evaporate first; (3) use a more volatile solvent; (4) use the colorcoat composition at a lower temperature and/or (5) change the polymer to the extent needed to render it more insoluble.

A coalescing solvent can be present in the composition. For example, a solvent/non-solvent mixture can be used as the liquid phase wherein at least some of the solvent remains in the color coat after the wiping operation has been completed and the non-solvent has been evaporated. The remaining solvent provides a means of coalescing the wiped color-coat; or the liquid phase can be a solvent for the polymer at an elevated temperature. Care is taken in the selection of the liquid phase and the coalescing conditions so as to avoid any harmful reaction, e.g., undue solvent attack on the substrate or any coating beneath the color coat. It is emphasized however that some of the most useful color coat compositions of this invention are those in which the liquid phase is completely (or almost completely) free of any liquid which will serve as a coalesing solvent at temperatures in the range of about 40°–95°C. and higher.

In the interest of obtaining a color coat having the most practical storage and shipping characteristics, usually only part of the liquid phase matter is added to the original mixture with polymer and pigment; then the rest of the liquid is added shortly before applying the composition to the substrate. Two important factors, of course, in selecting the amount and type of liquid to add at either stage are: the desired color coat viscosity, and the desired color coat drying rate. One skilled in the art, after reading the present disclosure, will be able to select the type and amount of liquid phase that gives the best results in any particular application.

The polymer component is insoluble in the liquid phase at normal room temperatures (or other conditions to which the composition will be exposed before the color coat has been wiped) and have the capacity to form an adherent coalesced color coat when a layer of the composition which has been applied to a substrate and wiped to the desired appearance is subjected to the coalescing action of a suitable coalescing means, for example, a solvent for the polymer, or heat plus solvent.

It is usually preferred that the composition has a polymeric content of about 5–15 percent by weight. In coating further dilution may be desirable.

The pigment of the color-coat composition can be any pigment which provides the desired color characteristics in the dried, coalesced color coat, and which is not harmful to the formation of the coating or the properties of the final product. This includes nearly all of the pigments known to be useful in coating compositions. Among the preferred pigments, especially when the substrate is wood, are burnt umber, raw umber, VanDyke Brown, burnt sienna, raw sienna, mineral block, lithol red, titanium dioxide and the like. Other useful pigments are illustrated as follows: ferrite yellow-orange, zinc oxide, zinc sulfide, lead titanate, antimony oxide, zirconium oxide, white lead, basic lead silicate, lithopone carbon black, other iron oxides of various colors, lead chromate and molybdate orange; also the pigments sometimes referred to as pigment extenders, for example, calcium carbonate, talc, barytes, diatomaceous earth, asbestine, china clay, silica and fine mica; also various known nitroso-, nitro-, azo- and pyrazolone pigments as well as basic dye-, auxanthine dye-, anthraquinone-, phthalo- cyanine-, and vat color pigments.

The composition contains the dispersed polymer particles and the dispersed pigment particles in a weight ratio between about 1:99 to 40:60. A weight ratio of between about 5:95 to 35:65 is preferred. The best ratio in any particular application will depend on such factors as pigment hiding power and absorption properties, the porosity of the substrate to be coated with the color coat, and the overall color effect desired.

The composition can contain a small amount of a polymer chemically different from the dispersed polymeric phase or some other film-former, in solution in the liquid phase as long as it does not prevent obtaining the desired coating, wiping, and coalescing properties, as well as coating adhesion and durability and other properties of the finished product. The same applies to other additives which can be dissolved or dispersed in the composition. For example the composition can contain one or more of the following: a dissolved polymer known to be useful has a stabilizer in polymer dispersions to prevent or retard agglomeration and settling of the particles; a drying oil; an oil-modified alkyd or other synthetic resin; a plasticizer, e.g., a nonvolatile liquid, for the polymeric disperse phase or any other polymer present, flatting agents; dyes; fungicides; and drying and curing agents, and the like.

In carrying out the process of this invention, at least one layer of the color composition described above is applied to at least one surface of a substrate by any suitable coating method, for example by spraying, brushing, spreading, dipping, rolling or flow-coating. Then the coated surface is wiped with any suitable wiping means, for example an absorbent cloth, a piece of burlap, sponge, chamois, brush, roller or the like, until the wiped surface has the desired appearance and the color coat remaining on the surface is present in the desired amount and location. In some applications the best results are obtained when at least some of the liquid phase is allowed to evaporate before the surface is wiped. The term "wiping" is used for th sake of convenience; it includes the concept of brushing the surface to obtain the desired color coat appearance.

After the wiping operation, any remaining liquid phase matter is evaporated and the color coat is subjected to the action of heat, solvent or other means capable of causing the particles to coalesce; a solidified coalesced color coat is obtained.

At least part of the liquid phase matter can be evaporated during or after the coalescing of the polymeric disperse phase in some embodiments of the invention. In other embodiments, all or practically all of the liquid phase is evaporated before causing the polymer to coalesce. To illustrate: the original composition can be free of any liquid which is a solvent for the polymer at 80°C.; all of the liquid phase matter remaining after wiping can be evaporated at 80°C.; then the dried color coat can be heated at 90°C. until the polymeric component has coalesced. In a modification of the embodiment just illustrated, the composition can contain a non-volatile liquid plasticizer for the polymer which will cause the polymer to coalesce at 95°C., or at any other practical coalescing temperature one might select. This is one preferred means of coalescing the polymeric component by causing a solvent for the particles to coalesce them, the solvent in this case being a nonvolatile liquid which remains in the color coat.

Another illustration of this concept, and a particularly preferred embodiment of the invention, comprises bringing a volatile solvent for the polymeric component in contact with the wiped and dried color coat by applying thereto a coat of a substantially clear coating composition containing a film-former dissolved in or dispersed in a volatile organic liquid containing said solvent. For example, as illustrated with the sealer coat used in Example 4 below, the clear coating composition can contain the film-former in the form of fine particles dispersed in a volatile organic liquid (containing said solvent) in which the film-former is substantially insoluble under conditions to which the composition will be subjected before it is applied to the color coat. Or the clear coating composition can be a solution in a volatile organic liquid (containing said solvent) of at least one film-former such as a drying oil, a synthetic resin or a natural resin. A film-former is selected which will have suitable adhesion to the color coat. After the volatile solvent has caused the polymer to coalesce at the coalescing temperature selected, the solvent is evaporated. The resulting product has a dried protective clear coat, e.g., top coat, in superposed adherence with the coalesced color coat.

One preferred product of the invention is an article comprising a substrate which originally has relatively large pores e.g., as used in Example 4, and having a surface coated with a composite solidified finish containing at least one wiped and dried coalesced coat of the novel color composition, and at least one clear coat (through which one can see the color coat) of a clear film-forming composition; for example, a finish resulting from applying in sequence (a) at least one surface preparation coat of a film-forming composition such as a washcoat, barrier coat, or both; (b) a wiped filler coat of the novel color composition; (c) a sealer coat of the clear composition; and (d) a topcoat of the clear composition. An acrylic polymer as described above is especially useful as the film-former in coats b, c, and d as well as in coat (a).

Another preferred product has a finish as described in the previous paragraph except there is a wiped glaze coat of the color composition in interposed adherence with coats c and d; again the acrylic polymer is very useful as the filmformer in each of the coats.

Other preferred products have characteristics as described in the previous two paragraphs except the substrate is one originally having relatively small pores, e.g., articles made of maple wood; and in preparing the composite finish, a wiping stain coat of the novel color composition is applied to the suitably prepared substrate (instead of the filler coat) and wiped, dried and coalesced in accordance with the procedure described in the present disclosure, then the sealer coat and topcoat are applied. Also, as described above, it is often desirable to apply a glaze coat so as to be in interposed adherence with the sealer coat and topcoat.

Although the most beneficial utility of the present invention will usually be realized when the substrate is made of wood, useful, attractive, and durable articles can also be made by applying the color coat to various other substrates; for example metal, leather, paper, fabrics, polymer coated fabrics and papers, molded plastic articles, and plastic sheet materials. Any of these substrates can have a smooth flat surface, and the wiping operation can consist largely of removing a certain amount of the color coat in certain areas of the coated surface. However, the greatest advantages of the invention will usually result from using a substrate whose surface is not entirely smooth, flat or non-porous. Examples of especially useful substrates are: wood having a very noticeable grain pattern or visible pores, and various kinds of sheet materials and molded articles whose surface has an attractive pattern of recesses or raised areas.

Porous and non-porous plastic articles can receive the same novel finish described herein as wood articles. Items to be finished are often composite articles containing both wood and plastic components, and in some cases other materials as well. The composite articles can be beneficially finished according to the present invention. Components of certain kinds of plastics and other materials which are not sufficiently resistant to the dispersions or solutions of the finishing compositions can be supplied in a pre-treated condition, as is well known in the art. For example, a barrier coat can be formed on plastic articles by coating them with a solution or dispersion in a harmless volatile liquid of a film-former resistant to attack by the organic liquids present in the finishing compositions.

By using the finishing process and color-coat composition of the present invention, one can readily obtain products having a decorative and protective finish which is very adherent and durable. A finish can be obtained which is particularly resistant to damage by dragging such objects as dishes, suitcases and furniture across the coated surface and by dropping objects on the coated surface. Thus, the finish has outstanding utility when applied to furniture, floors, wall panels and the like which are made of wood; it is also useful when applied to various other substrates. Excellent appearance is readily obtainable in combination with the beneficial mar resistance. The mar resistance of the finish can be demonstrated by the commonly used "coin mar test" wherein the edge of a coin is dragged across the coated surface and any shearing, chipping or flaking of the coating is observed.

Furthermore, in contrast with certain widely-used color-coat processes which require a lengthy drying operation between wiping and topcoating, e.g., those using a drying-oil type film-former, the present process enables one to use a very brief drying cycle and still obtain excellent wiping characteristics, topcoat adhesion, and mar resistance. And color-coat wiping characteristics are obtainable with the novel composition which are as good or better than the best quality conventional oil-type color-coat material. Moreover, the present invention makes it possible to obtain new and beneficial results in applying clear topcoats to the color coated article since superior adhesion and mar resistance can be obtained with topcoats of various polymers including acrylic polymers which give poor adhsion and mar resistance when applied to a conventional oil type color coat. The ability to replace conventional cellulose nitrate and oil-type topcoats with solutions and dispersions of clear acrylic polymers and the like provides important advantages in many applications. A composite finish having excellent resistance to becoming discolored is easily obtained. Improved finish properties, e.g., better adhesion and mar resistance, can also be obtained when conventional topcoats are applied to the color-coat of this invention.

The examples which follow are given for the purpose of illustrating the invention. All quantities shown are on a weight basis unless otherwise indicated.

EXAMPLE 1

A wiping-type color composition which is very useful in the application of a color coat, e.g., "filler" coat, on wood furniture and other substrates is prepared as follows.

A dispersion of fine particles of an acrylic polymer in a volatile organic liquid is produced by (1) providing a glass-lined reaction vessel equipped with a hot water jacket, stirrer and reflux condenser and means for adding ingredients to the vessel; (2) adding to the vessel each of the ingredients shown in formula A below (the seed stage); (3) stirring formula A at about 152 rpm for 1 hour while heating it at a reflux temperature of 79°C., using a water jacket temperature of 95°C.; (4) gradually adding to the vessel over a period of 2.5 hours, by way of the returning reflux stream resulting from step 3, a preblended mixture of the ingredients shown in formula B below (the feed stage), the reflux rate being such that the weight ratio of returning reflux stream to formula B entering the vessel is about 2:1, and the stirring rate being about 132 rpm; (5) allowing the contents of the vessel to be refluxed and stirred for 1 hour after completion of step (4); and (6) cooling the resulting dispersion to 22°C.

|  | Formula A Parts | Formula B Parts |
|---|---|---|
| Methyl methacrylate | 1.32 | 17.19 |
| Stabilizer | 0.52 | 6.11 |
| Methyl acrylate | — | 12.34 |
| Hexane | 14.88 | — |
| Aliphatic hydrocarbon B.R. (boiling range) 138°–177°C. | 8.32 | — |
| Initiator, azobis(isobutyronitrile) | 0.06 | 0.10 |
|  | 25.10 | 35.74 |

The stabilizer ingredient is a 33 percent solution of a dispersion stabilizer made by a process which comprises first making a precursor by reacting poly(1 2-hydroxy stearic acid), molecular weight about 1,500, with glycidyl methacrylate; and then reacting the resulting precursor with methyl methacrylate (MM) and methacrylic acid (MAA), the MM:MAA ratio being 98:2.

More specifically, the stabilizer is prepared by (a) heating a mixture of 93.97 parts of commercial 1 2-hydroxy stearic acid, 5.22 parts of VM+P naphtha, 5.22 parts of mineral spirits, B.R. 145°–215°C., and 0.37 part of catalyst (isopropanol ester of orthotitanic acid) under an atmosphere of nitrogen, while removing water by azeotrope distillation and keeping the temperature below 200°C., e.g., about 195°C., until the theoretical volume of water for substantially complete reaction has been removed; (b) mixing 52.00 parts of the resulting poly (1 2 hydroxy stearic acid) solution with 5.90 parts of glycidyl methacrylate, 20.97 parts VM+P naphtha, 20.98 parts of mineral spirits, 0.10 part of cocodimethylamine* (about 90 percent of which is the tertiary amine $C_{12}H_{25}N—(CH_3)_2$ and 0.5 part t-butyl catechol; (c) refluxing the resulting mixture until the acid value is about zero; (d) adding gradually over a period of 3 hours to the refluxing mixture a mixture of 11.74 parts of ethyl acetate and 5.87 parts of butyl acetate, a mixture of 32.02 parts of the precursor solution resulting from step (c), 16.01 parts of methyl methacrylate, 0.33 parts of methacrylic acid and 0.67 part of azodiisobutyronitrile; (e) refluxing the mixture for an additional two hours; and (f) adding enough VM+P naphtha so that the resulting composition contains about 33 percent of nonvolatile component.

*Made from a mixture containing coconut-oil fatty acids.

The resulting acrylic polymer dispersion has an acrylic copolymer content of about 54 percent, and a Brookfield viscosity of about 60 centipoises, using a number three spindle at 100 rpm. The methyl methacrylate:methyl acrylate weight ratio in the copolymer is about 60:40; the copolymer is amorphous; and it has a Tg of about 59°C. The finely-divided polymer particles have an average diameter of about 0.1 micron.

Next, the filler-coat composition is prepared according to formula C as follows:

FORMULA C

| No. |  | Parts |
|---|---|---|
| 1 | Aliphatic hydrocarbon, B.R. 138°–177°C. | 5.87 |
| 2 | Suspending agent | 1.05 |
| 3 | Burnt umber pigment | 7.14 |
| 4 | Naphtha, VM & P grade | 7.52 |
| 5 | Magnesium silicate | 7.07 |
| 6 | Naphtha, VM & P | 4.29 |
| 7 | Silica, crystalline | 5.86 |
| 8 | Calcium sulfate, hydrous | 33.23 |
| 9 | Same as No. 1 | 14.44 |
| 10 | Acrylic polymer dispersion, made as described above | 13.53 |
|  |  | 100.00 |

The suspending agent is "Armogel" from the Polyester Corporation, Southhampton, N.Y.; this is understood to be hydrogenated castor oil; it is a known dispersion stabilizer which renders compositions resistant to agglomeration and settling of the dispersed particles. The formula C composition is made by (a) providing a mixing apparatus adapted to mix a paste-like composition, for example a Cowles Dissolver; (b) adding ingredients 1, 2 and 3, mixing for 10 minutes, and continuing the mixing while the remaining ingredients are added; (c) generally adding ingredients 4 and 5 over a period of 15 minutes; (d) gradually adding a preblended mixture of ingredients 6 and 9 and a preblended mixture of ingredients 7 and 8 over a period of 1 hour, and mixing for an additional 10 minutes; and (e) adding ingredient 10 and mixing for 25 minutes.

The resulting filler composition has an acrylic polymer content of 7.31 percent, a volatile aliphatic hydrocarbon content of 38.34 percent, a pigment content (including pigment extender) of 53.30 percent, and a polymer:pigment ratio of about 12:88. This filler has good stability during storage and shipment; it is a useful article of commerce, especially for furniture manufacturers. It can be applied to a substrate as is, or it can be diluted with a suitable volatile organic liquid to modify its drying rate and/or to make it easier to apply by any particular coating methsd which might be selected.

EXAMPLE 2

A wiping-type color composition which is very useful in the application of a color coat (for example "glaze" coat) on wood furniture and other substrates is prepared according to formula D as follows:

FORMULA D

| No. | | Parts |
|---|---|---|
| 1 | Van Dyke brown pigment | 80 |
| 2 | Acrylic polymer dispersion as described above | 40 |
| 3 | Mineral spirits B.R. 145°–215°C. | 60 |
| 4 | Same as No. 3 | 40 |
| | | 220 |

The glaze composition is made by adding ingredients 1 to 3 to a ball mill and ball milling the mixture for 3 days; then adding ingredient 4 and ball milling for 15 minutes. The glaze has a polymer:pigment ratio of about 21:79; the polymer content is about 9.8 percent. One gallon of the resulting glaze is mixed with 1 gallon of kerosene just before it is to be sprayed onto a substrate.

EXAMPLE 3

Another very useful glaze is prepared by following the procedure described in Example 2 except one gallon of the ball milled formula D is mixed with one gallon of a preblended thinner composed of 3 parts of kerosene and 1 part of di(2-ethyl hexyl)phthalate (a plasticizer for the acrylic polymer); this is done shortly before the glaze is to be sprayed onto a substrate.

EXAMPLE 4

Articles made of wood, including tables, desks, chairs and wall panels made of oak, walnut, and mahogony, are given a very mar-resistant finish by a process which comprises the use of the Example 1 filler and the Example 3 glaze. The wood has relatively large pores.

First one piece of each item is stained and one piece of each item is left free of stain. The stain, which can be any suitable non-grain-raising stain known to be useful on wood articles, is applied by means of a paint sprayer to the bare smoothly-sanded surfaces. Enough of the stain is applied to give the articles the desired color; then the stain coat is dried.

Next, a clear acrylic wash coat is applied to all the stained and non-stained articles. The wash coat is applied by means of a sprayer to a dry-film thickness of 0.2 mil. The wash coat composition is a 5 percent solution of an acrylic polymer in a solvent composed of 97 percent toluene, 5 percent of 2-ethoxy ethyl acetate and 3 percent of 2-butoxy ethanol; the acrylic polymer is a terpolymer of 55 parts methyl methacrylate, 40 parts methyl acrylate and 5 parts dimethyl aminoethyl methacrylate. When the wash coat is dry the articles are lightly sanded to enhance surface smoothness. The wash coat lines the pores of the substrate without filling them, and facilitates obtaining the desired effect when wiping the filler coat.

A filler coat is then applied to each article by means of a paint sprayer in an amount sufficient to cover the surface thoroughly. The filler composition is prepared by mixing two gallons of the formula C filler of Example 1 with 2 gallons of mineral spirits. The surface is wiped with a clean piece of burlap or other suitable wiping means so that (a) the excess filler is removed, (b) the surface has the desired appearance, and (c) the filler remaining on the surface (residual filler) is present in the desired amount and location, for example in the pores and other recesses. The filler has excellent wiping characteristics; in fact, it is wiped more easily and effectively than typical commercial fillers based on drying oils or oil-modified alkyd resins mixed with the solvents and pigments. The filler coat is dried for 15 minutes at 60°C.; this removes substantially all the volatile ingredients but does not coalesce the polymer particles.

The filler provides filling of the pores, leveling of the surface, emphasis of the grain pattern, and color contrast between the pores and the rest of the substrate.

A clear acrylic sealer coat is now sprayed onto each article to a dry-film thickness of 1 mil (0.001 inch). The sealer composition is prepared by mixing 110 parts of the 54 percent acrylic polymer dispersion described in Example 1 with a preblended mixture of (a) 46 parts of mineral spirits, (b) 15 parts of 2-butoxy ethanol and (c) 30 parts of 2-ethoxy ethyl acetate. Ingredients b and c serve as coalescing solvents; thus when the sealer coat is dried, ingredients b and c cause the polymer particles to coalesce in the color coat and in the sealer coat. An integral coating structure is thereby formed.

After drying the sealer coat at 25°C. for 1 hour and thereby coalescing the color coat and sealer coat, and then lightly sanding the sealer coat, each article is spray-coated with a glaze coat in an amount sufficient to cover the surface. The glaze composition is prepared as described in Example 3. The coated surface is wiped as described above for the filler except the burlap is replaced with a piece of clean cotton diaper material. The glaze has good wiping characteristics; it is easy to obtain a uniform color effect where desired during wiping, and to obtain a gradual transition from dark areas to light areas. The glaze coat is dried for 10 minutes at 60°C. to remove the volatile ingredients and to cause coalescence of the polymer component; this greatly improves its resistance to harmful changes in appearance due to handling and contact with other articles prior to application of the topcoat. The coalescence is facilitated by the plasticizer present in the composition.

The glaze, when wiped in the desired manner, provides the finish with the desired color and color pattern, and provides further emphasis of the grain pattern and figure of the wood.

Finally, each article is spray-coated with a clear acrylic topcoat to a dry-film thickness of 2 mils. The topcoat composition has the same formula as the sealer composition that was applied over the filler coat. The topcoat is dried for one-half hour at 25°C. to evaporate most of the volatile matter. To be sure that tne topcoat is fully coalesced, the surface is sprayed lightly with 2-ethoxy ethyl acetate and dried for one-half hour at 50°C. and then for 1 hour at 60°C. The dried coalesced topcoat appears to be completely transparent.

The resulting finished articles have a very attractive, decorative and protective finish. The finish has excellent ability to retain its good appearance when the articles are in use over an extended period of time; the finish has little or no tendency to become yellowed or otherwise discolored. The finish is surprisingly adherent and durable; this can be confirmed by the "coin mar test" mentioned above, and by attempting to mar the finish with the apparatus known in the art as the "Organic Coating Adhesion Tester," made by the U.S. Testing Company.

When Example 4 is repeated except the filler and glaze are replaced with a typical conventional filler and glaze prepared by adding pigment and drier to a solution of a drying oil such as linseed oil, and the wiped color coats are given ample time to dry thoroughly, the finish has poor adhesion and durability. Instead of having excellent mar resistance like in Example 4, the finish has poor mar resistance.

A good useful finish is obtained when Example 4 is repeated except a known flatting agent is added to the topcoat composition in an amount which results in a noticeable reduction in the gloss and clarity of the topcoat.

EXAMPLE 5

Articles made of wood having relatively small pores, e.g., maple, are given a very mar-resistant finish by (1) spraycoating each article with a wiping stain made by mixing one gallon of the nondiluted glaze of Example 2 (polymer content about 9.8 percent) with 2 gallons of mineral spirits; (2) wiping the stain coat with a clean cotton diaper to obtain the desired effect on color and grain pattern; (3) drying the stain coat for 30 minutes at 60°C.; (4) applying an acrylic sealer coat as described in Example 4; (5) drying the sealer coat at 25°C. for 1 hour, thereby coalescing both the sealer coat and the residual stain coat; (6) lightly sanding the sealer coat; (7) applying a glaze coat and drying and coalescing it as described in Example 4; and (5) applying a clear acrylic top coat and drying and coalescing it as described in Example 4.

The coat of wiping stain, when wiped in the proper manner, provides the finish with the desired color type and pattern plus an attractive accent of the pores and grain pattern.

I claim:
1. A process which comprises
   1. applying to the surface of a substrate a dispersion comprising a continuous organic liquid phase and a dispersed phase comprising
      A. particles of a linear polymer which polymer has a Tg between about 10°C. and 70°C., is amorphous and has at least 50 percent by weight of acrylic monomer units, said polymer being soluble in at least one common solvent at 25°C., said dispersed polymer phase being substantially insoluble in said liquid at temperatures up to about 38°C., and
      B. particles of a pigment, the weight ratio of A:B being about 1:99 to 40:60
   said dispersed polymer being present in an amount of less than 15 percent by weight of the dispersion, said dispersion forming a noncoalesced layer when applied and dried by evaporation of volatile components in the liquid phase at temperatures up to about 38°C. and forming therefrom a layer of the dispersed phase having substantially no coalescence,
   2. wiping the layer on said surface with wiping means to attain the desired appearance of the wiped layer on the surface and
   3. coalescing the layer to form a substantially coalesced layer.

2. A process according to claim 1 wherein the coalescing step comprises contacting said layer with a solvent and subsequently evaporating said solvent.

3. A process according to claim 1 wherein the polymer in the dispersed phase has a Tg between about 40°C. and 70°C. and is at least one member selected from the group consisting of poly(alkyl acrylates), poly(alkyl methacrylates), interpolymers of an alkyl acrylate and an alkyl methacrylate, and interpolymers of about 50–99.9 percent by weight of units of an alkyl acrylate or an alkyl methacrylate and about 0.1–50 percent by weight of units of another ethylenically unsaturated compound selected from the group consisting of vinyl acetate, styrene, vinyl chloride, vinylidene chloride.

4. A process according to claim 3 wherein the coalescing step comprises contacting said layer with a solvent and subsequently evaporating said solvent.

5. A process according to claim 3 wherein the weight ratio of A:B is between about 5:95 and 35:65.

6. A process according to claim 5 wherein the coalescing step comprises contacting said layer with a solvent and subsequently evaporating said solvent.

7. A process according to claim 3 wherein the polymer particles have an average diameter of about 0.05–1 micron.

8. A process according to claim 7 wherein the coalescing step comprises contacting said layer with a solvent and subsequently evaporating said solvent.

* * * * *